(12) United States Patent
Zamora et al.

(10) Patent No.: US 8,946,130 B2
(45) Date of Patent: *Feb. 3, 2015

(54) METHODS FOR INCREASE GAS PRODUCTION AND LOAD RECOVERY

(75) Inventors: Frank Zamora, San Antonio, TX (US); Sarkis R. Kakadjian, San Antonio, TX (US); Erin Fitzgerald, San Antonio, TX (US); Tina Garza, San Antonio, TX (US)

(73) Assignee: Clearwater International LLC, Houston, TX (US)

( * ) Notice: Subject to any disclaimer, the term of this patent is extended or adjusted under 35 U.S.C. 154(b) by 642 days.

This patent is subject to a terminal disclaimer.

(21) Appl. No.: 12/464,351

(22) Filed: May 12, 2009

(65) Prior Publication Data
US 2009/0275488 A1  Nov. 5, 2009

Related U.S. Application Data

(60) Continuation-in-part of application No. 12/151,429, filed on May 6, 2008, now Pat. No. 7,956,017, which is a division of application No. 11/298,547, filed on Dec. 9, 2005, now Pat. No. 7,392,847.

(51) Int. Cl.
*C09K 8/60* (2006.01)
*C09K 8/528* (2006.01)
(Continued)

(52) U.S. Cl.
CPC . *C09K 8/575* (2013.01); *C09K 8/02* (2013.01); *C09K 8/506* (2013.01); *C09K 8/516* (2013.01); *C09K 8/68* (2013.01); *C09K 8/805* (2013.01); *E21B 21/00* (2013.01); *E21B 43/025* (2013.01); *E21B 43/267* (2013.01); *E21B 2021/006* (2013.01)
USPC ........... 507/204; 507/236; 507/245; 507/269; 507/205; 507/271; 166/280.2

(58) Field of Classification Search
CPC .......... C09K 8/035; C09K 8/04; C09K 8/528; C09K 8/72; C04B 28/02; C02F 5/14
USPC ................. 507/204, 205, 236, 245, 269, 271; 166/280.1, 280.2
See application file for complete search history.

(56) References Cited

U.S. PATENT DOCUMENTS 2,196,042 A   4/1940   Timpson .......................... 23/11
2,390,153 A   12/1945  Kern ............................... 260/72
(Continued)

FOREIGN PATENT DOCUMENTS

CA   2125513   1/1995
DE   4027300   5/1992   ............. B10D 53/14
(Continued)

OTHER PUBLICATIONS

U.S. Appl. No. 12/750,335, filed Mar. 30, 2010, Parker.
(Continued)

*Primary Examiner* — Bijan Ahvazi
*Assistant Examiner* — Atnaf Admasu
(74) *Attorney, Agent, or Firm* — Robert W Strozier

(57) ABSTRACT

Methods are disclosed for improved sand control, fines control, load recovery and well productivity, where the compositions comprise reaction products of an amine and a phosphate-containing compound.

23 Claims, 11 Drawing Sheets

(51) Int. Cl.
*C09K 8/74* (2006.01)
*C23F 11/18* (2006.01)
*E21B 43/267* (2006.01)
*C09K 8/575* (2006.01)
*C09K 8/02* (2006.01)
*C09K 8/506* (2006.01)
*C09K 8/516* (2006.01)
*C09K 8/68* (2006.01)
*C09K 8/80* (2006.01)
*E21B 21/00* (2006.01)
*E21B 43/02* (2006.01)

(56) References Cited

U.S. PATENT DOCUMENTS

| | | | | |
|---|---|---|---|---|
| 2,805,958 | A | 7/1959 | Bueche et al. | 106/308 |
| 3,059,909 | A | 10/1962 | Wise | 261/39.3 |
| 3,163,219 | A | 12/1964 | Wyant et al. | 166/283 |
| 3,301,723 | A | 1/1967 | Chrisp | 149/20 |
| 3,301,848 | A | 1/1967 | Halleck | 536/123.1 |
| 3,303,896 | A | 2/1967 | Tillotson et al. | 175/69 |
| 3,317,430 | A | 5/1967 | Priestley et al. | 510/503 |
| 3,565,176 | A | 2/1971 | Wittenwyler | 166/270 |
| 3,856,921 | A | 12/1974 | Shrier et al. | 423/228 |
| 3,888,312 | A | 6/1975 | Tiner et al. | 166/308.5 |
| 3,933,205 | A | 1/1976 | Kiel | 166/308.1 |
| 3,937,283 | A | 2/1976 | Blauer et al. | 166/307 |
| 3,960,736 | A | 6/1976 | Free et al. | 507/216 |
| 3,965,982 | A | 6/1976 | Medlin | 166/249 |
| 3,990,978 | A | 11/1976 | Hill | 507/235 |
| 4,007,792 | A | 2/1977 | Meister | 166/308.2 |
| 4,052,159 | A | 10/1977 | Fuerst et al. | |
| 4,067,389 | A | 1/1978 | Savins | 166/246 |
| 4,108,782 | A | 8/1978 | Thompson | 507/205 |
| 4,112,050 | A | 9/1978 | Sartori et al. | 423/223 |
| 4,112,051 | A | 9/1978 | Sartori et al. | 423/223 |
| 4,112,052 | A | 9/1978 | Sartori et al. | 423/223 |
| 4,113,631 | A | 9/1978 | Thompson | 507/202 |
| 4,378,845 | A | 4/1983 | Medlin et al. | 166/297 |
| 4,461,716 | A | 7/1984 | Barbarin et al. | 252/307 |
| 4,479,041 | A | 10/1984 | Fenwick et al. | 200/81 R |
| 4,506,734 | A | 3/1985 | Nolte | 166/308.1 |
| 4,514,309 | A | 4/1985 | Wadhwa | 507/211 |
| 4,541,935 | A | 9/1985 | Constien et al. | 507/225 |
| 4,549,608 | A | 10/1985 | Stowe et al. | 166/280.1 |
| 4,561,985 | A | 12/1985 | Glass, Jr. | 507/108 |
| 4,623,021 | A | 11/1986 | Stowe | 166/250.1 |
| 4,654,266 | A | 3/1987 | Kachnik | 428/403 |
| 4,657,081 | A | 4/1987 | Hodge | 166/380.5 |
| 4,660,643 | A | 4/1987 | Perkins | 166/283 |
| 4,683,068 | A | 7/1987 | Kucera | 507/201 |
| 4,686,052 | A | 8/1987 | Baranet et al. | 507/244 |
| 4,695,389 | A | 9/1987 | Kubala | 507/244 |
| 4,705,113 | A | 11/1987 | Perkins | 166/302 |
| 4,714,115 | A | 12/1987 | Uhri | 166/308.1 |
| 4,718,490 | A | 1/1988 | Uhri | 166/281 |
| 4,724,905 | A | 2/1988 | Uhri | 166/250.1 |
| 4,725,372 | A | 2/1988 | Teot et al. | 507/129 |
| 4,739,834 | A | 4/1988 | Peiffer et al. | 166/308.4 |
| 4,741,401 | A | 5/1988 | Walles et al. | 166/300 |
| 4,748,011 | A | 5/1988 | Baize | 423/228 |
| 4,779,680 | A | 10/1988 | Sydansk | 166/300 |
| 4,795,574 | A | 1/1989 | Syrinek et al. | 507/238 |
| 4,817,717 | A | 4/1989 | Jennings, Jr. et al. | 166/278 |
| 4,830,106 | A | 5/1989 | Uhri | 166/250.1 |
| 4,846,277 | A | 7/1989 | Khalil et al. | 166/280.1 |
| 4,848,468 | A | 7/1989 | Hazlett et al. | 166/300 |
| 4,852,650 | A | 8/1989 | Jennings, Jr. et al. | 166/250.1 |
| 4,869,322 | A | 9/1989 | Vogt, Jr. et al. | 166/280.1 |
| 4,892,147 | A | 1/1990 | Jennings, Jr. et al. | 166/280.2 |
| 4,926,940 | A | 5/1990 | Stromswold | 166/247 |
| 4,938,286 | A | 7/1990 | Jennings, Jr. | 166/280.1 |
| 4,978,512 | A | 12/1990 | Dillon | 423/226 |
| 5,005,645 | A | 4/1991 | Jennings, Jr. et al. | 166/280.1 |
| 5,024,276 | A | 6/1991 | Borchardt | 166/308.6 |
| 5,067,556 | A | 11/1991 | Fudono et al. | 62/196.4 |
| 5,074,359 | A | 12/1991 | Schmidt | 166/280.1 |
| 5,074,991 | A | 12/1991 | Weers | 208/236 |
| 5,082,579 | A | 1/1992 | Dawson | 507/211 |
| 5,106,518 | A | 4/1992 | Cooney et al. | 507/21 |
| 5,110,486 | A | 5/1992 | Manalastas et al. | 507/260 |
| 5,169,411 | A | 12/1992 | Weers | 44/421 |
| 5,224,546 | A | 7/1993 | Smith et al. | 166/300 |
| 5,228,510 | A | 7/1993 | Jennings, Jr. et al. | 166/263 |
| 5,246,073 | A | 9/1993 | Sandiford et al. | 166/295 |
| 5,259,455 | A | 11/1993 | Nimerick et al. | 166/308.5 |
| 5,330,005 | A | 7/1994 | Card et al. | 166/280.2 |
| 5,342,530 | A | 8/1994 | Aften et al. | 252/8.551 |
| 5,347,004 | A | 9/1994 | Rivers et al. | 544/180 |
| 5,363,919 | A | 11/1994 | Jennings, Jr. | 166/308.1 |
| 5,402,846 | A | 4/1995 | Jennings, Jr. et al. | 166/259 |
| 5,411,091 | A | 5/1995 | Jennings, Jr. | 166/280.1 |
| 5,424,284 | A | 6/1995 | Patel et al. | 507/129 |
| 5,439,055 | A | 8/1995 | Card et al. | 166/280.2 |
| 5,462,721 | A | 10/1995 | Pounds et al. | 423/226 |
| 5,465,792 | A | 11/1995 | Dawson et al. | 166/295 |
| 5,472,049 | A | 12/1995 | Chaffee et al. | 166/250.1 |
| 5,482,116 | A | 1/1996 | El-Rabaa et al. | 166/250.1 |
| 5,488,083 | A | 1/1996 | Kinsey, III et al. | 507/211 |
| 5,497,831 | A | 3/1996 | Hainey et al. | 166/308.1 |
| 5,501,275 | A | 3/1996 | Card et al. | 166/280.2 |
| 5,551,516 | A | 9/1996 | Norman et al. | 166/308.2 |
| 5,614,010 | A * | 3/1997 | Smith et al. | 106/285 |
| 5,624,886 | A | 4/1997 | Dawson et al. | 507/217 |
| 5,635,458 | A | 6/1997 | Lee et al. | 507/240 |
| 5,649,596 | A | 7/1997 | Jones et al. | 166/300 |
| 5,669,447 | A | 9/1997 | Walker et al. | 166/300 |
| 5,674,377 | A | 10/1997 | Sullivan, III et al. | 208/208 R |
| 5,688,478 | A | 11/1997 | Pounds et al. | 423/228 |
| 5,693,837 | A | 12/1997 | Smith et al. | 556/148 |
| 5,711,396 | A | 1/1998 | Joerg et al. | 180/444 |
| 5,722,490 | A | 3/1998 | Ebinger | 166/281 |
| 5,744,024 | A | 4/1998 | Sullivan, III et al. | 208/236 |
| 5,755,286 | A | 5/1998 | Ebinger | 166/281 |
| 5,775,425 | A | 7/1998 | Weaver et al. | 166/276 |
| 5,787,986 | A | 8/1998 | Weaver et al. | 166/280.2 |
| 5,806,597 | A | 9/1998 | Tjon-Joe-Pin et al. | 166/300 |
| 5,807,812 | A | 9/1998 | Smith et al. | 507/238 |
| 5,833,000 | A | 11/1998 | Weaver et al. | 166/276 |
| 5,853,048 | A | 12/1998 | Weaver et al. | 166/279 |
| 5,871,049 | A | 2/1999 | Weaver et al. | 166/276 |
| 5,877,127 | A | 3/1999 | Card et al. | 507/273 |
| 5,908,073 | A | 6/1999 | Nguyen et al. | 166/276 |
| 5,908,814 | A | 6/1999 | Patel et al. | 507/131 |
| 5,964,295 | A | 10/1999 | Brown et al. | 166/308.2 |
| 5,979,557 | A | 11/1999 | Card et al. | 166/300 |
| 5,980,845 | A | 11/1999 | Cherry | 423/229 |
| 6,016,871 | A | 1/2000 | Burts, Jr. | 166/300 |
| 6,035,936 | A | 3/2000 | Whalen | 166/308.5 |
| 6,047,772 | A | 4/2000 | Weaver et al. | 166/276 |
| 6,054,417 | A | 4/2000 | Graham et al. | 507/238 |
| 6,059,034 | A | 5/2000 | Rickards et al. | 166/280.2 |
| 6,060,436 | A | 5/2000 | Synder et al. | 507/266 |
| 6,069,118 | A | 5/2000 | Hinkel et al. | 507/277 |
| 6,123,394 | A | 9/2000 | Jeffrey | 299/16 |
| 6,133,205 | A | 10/2000 | Jones | 507/276 |
| 6,147,034 | A | 11/2000 | Jones et al. | 507/238 |
| 6,162,449 | A | 12/2000 | Maier et al. | 424/401 |
| 6,162,766 | A | 12/2000 | Muir et al. | 507/267 |
| 6,169,058 | B1 | 1/2001 | Le et al. | 507/222 |
| 6,228,812 | B1 | 5/2001 | Dawson et al. | 507/221 |
| 6,247,543 | B1 | 6/2001 | Patel et al. | 175/64 |
| 6,267,938 | B1 | 7/2001 | Warrender et al. | 423/226 |
| 6,283,212 | B1 | 9/2001 | Hinkel et al. | 166/279 |
| 6,291,405 | B1 | 9/2001 | Lee et al. | 507/136 |
| 6,330,916 | B1 | 12/2001 | Rickards et al. | 166/280.2 |
| 6,725,931 | B2 | 4/2004 | Nguyen et al. | 166/280.2 |
| 6,756,345 | B2 | 6/2004 | Pakulski et al. | 507/246 |
| 6,793,018 | B2 | 9/2004 | Dawson et al. | 166/300 |
| 6,832,650 | B2 | 12/2004 | Nguyen et al. | 166/279 |
| 6,875,728 | B2 | 4/2005 | Gupta et al. | 507/240 |
| 7,140,433 | B2 | 11/2006 | Gatlin et al. | 166/250.01 |
| 7,268,100 | B2 | 9/2007 | Kippie et al. | 507/244 |

(56) References Cited

U.S. PATENT DOCUMENTS

| | | | |
|---|---|---|---|
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | |
| 7,566,686 B2 | 7/2009 | Kippie et al. | 507/213 |
| 7,712,535 B2 | 5/2010 | Venditto et al. | |
| 7,767,628 B2 | 8/2010 | Kippie et al. | 507/102 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0131425 A1 | 6/2007 | Gatlin et al. | |
| 2007/0173413 A1 | 7/2007 | Lukocs et al. | 507/238 |
| 2007/0173414 A1 | 7/2007 | Wilson, Jr. | 507/131 |
| 2008/0197085 A1 | 8/2008 | Wanner et al. | |
| 2008/0251252 A1 | 10/2008 | Schwartz | |
| 2008/0257553 A1 | 10/2008 | Gatlin et al. | 166/280.2 |
| 2008/0257554 A1 | 10/2008 | Zamora et al. | |
| 2008/0269082 A1 | 10/2008 | Wilson, Jr. et al. | |
| 2008/0283242 A1 | 11/2008 | Ekstrand et al. | |
| 2008/0287325 A1 | 11/2008 | Thompson et al. | |
| 2008/0314124 A1 | 12/2008 | Sweeney et al. | |
| 2008/0318812 A1 | 12/2008 | Kakadjian et al. | |
| 2009/0067931 A1 | 3/2009 | Curr et al. | |
| 2009/0151959 A1 | 6/2009 | Darnell et al. | |
| 2009/0200027 A1 | 8/2009 | Kakadjian et al. | |
| 2009/0200033 A1 | 8/2009 | Kakadjian et al. | |
| 2009/0203553 A1 | 8/2009 | Gatlin et al. | |
| 2009/0250659 A1 | 10/2009 | Gatlin | 208/236 |
| 2010/0000795 A1 | 1/2010 | Kakadjian et al. | |
| 2010/0012901 A1 | 1/2010 | Falana et al. | |
| 2010/0077938 A1 | 4/2010 | Zamora et al. | |
| 2010/0122815 A1 | 5/2010 | Zamora et al. | |
| 2010/0181071 A1 | 7/2010 | van Petegen | |
| 2010/0197968 A1 | 8/2010 | Falana et al. | |
| 2010/0212905 A1 | 8/2010 | van Petegen | |
| 2010/0252262 A1 | 10/2010 | Ekstrand et al. | |

FOREIGN PATENT DOCUMENTS

| | | | |
|---|---|---|---|
| GB | 775376 | 10/1954 | |
| GB | 1073338 A | 6/1967 | |
| JP | 10001461 | 6/1988 | C07C 211/50 |
| JP | 08151422 | 11/1996 | |
| JP | 10110115 A | 4/1998 | |
| JP | 2005194148 A | 7/2005 | |
| WO | WO 98/56497 | 12/1998 | B01F 17/00 |

OTHER PUBLICATIONS

U.S. Appl. No. 12/473,805, filed May 28, 2009, Falana et al.
U.S. Appl. No. 12/510,101, filed Jul. 27, 2009, Falana et al.
U.S. Appl. No. 12/479,486, filed Jun. 5, 2009, Kakadjian et al.
Canadian Office Action for Canadian Counterpart.

* cited by examiner $$Pc = \text{Surface Tension} \times \cos(\theta)$$

Higher Contact Angle     Lower Contact Angle

| Berea Sandstone | Contact Angle (°) | Surface Tension (dyn/cm) |
|---|---|---|
| Untreated | 18.5 | 72.0 |
| Treated with Additive 1 | 55.8 | 40.7 |
| Treated with Current Microemulsion | 30.3 | 29.9 |

Higher better     Lower better

METHODS FOR INCREASE GAS PRODUCTION AND LOAD RECOVERY

RELATED APPLICATIONS

This application is a continuation-in-part of U.S. patent application Ser. No. 12/151,429, filed May 6, 2008, which is a divisional of U.S. patent application Ser. No. 11/298,547, filed Dec. 9, 2005, published as 2007/0131425 on Jun. 14, 2007, now U.S. Pat. No. 7,392,847, issued Jul. 1, 2008.

BACKGROUND OF THE INVENTION

1. Field of the Invention

Embodiments of the present invention relate to treating formations with a composition before, during and/or after a fracturing operation, where the treating composition improves sand and particulate control, improves load recovery and well productivity and reduce water blocking.

More particularly, embodiments of the present invention relate to treating formations with a composition that can be used before, added to slick water system, linear gel and crosslinked fracturing fluids or used after a fracturing operation, where the treating composition includes a phosphate/amine reaction product, which improves sand, fines and particulate control, improves load recovery and well productivity and reduces water blocking of fractured formations or producing formations in general.

2. Description of the Related Art

Historically the use of microemulsion systems for water block cleaning purpose and enhanced gas production date back to at least 1992. U.S. Pat. No. 5,310,002 shows micro emulsion formulations and use of the microemulsions, where surfactant blend is composed of ethoxylated alcohols, esters, alkyl sulfonates, alkyl phosphates, carboxylated-ethoxylated tallow amines and where the solvent is composed of primarily of mutual solvents like ethylene glycol monobutyl ether. U.S. Pat. No. 6,911,417 shows micro emulsion formulations and use of the micro emulsions, where the surfactant systems include alkylpolyglycoside, ethoxylated alcohols and linear alkyl alcohol. U.S. Pat. No. 7,380,606 discloses the use of microemulsions for well remediation including surfactant and a solvent selected from the group of alkyl or aryl esters of short chain alcohols and terpenes.

Although many fracturing systems are known in the art, there is still a need in the art for treating compositions that improves sand and particulate control, improves load recovery and well productivity and reduce water blocking fracturing formations with using a fracturing composition including a is that leak off water through the formation may inhibit gas or oil production by water blocking. These treating compositions work in all fracturing compositions such as slick water systems, linear gel systems, crosslinked systems and/or microemulsion systems.

SUMMARY OF THE INVENTION

Compositions

The present invention provides a particulate solid material such as a metal oxide-containing solid having improved self-aggregating properties. The improved self-aggregating or aggregation propensity of the particles derives from the surfaces of the particulate solids having a coating including a reaction product of a phosphate ester/acid and an amine.

The present invention provides particulate solid material such as a metal oxide-containing solids having a coating including a reaction product of an amine and a phosphate ester/acid, where the coating deforms under pressure and imparts an enhanced aggregating propensity to the solid particles.

The present invention provides an aggregated particulate solid material such as metal oxide-containing solid composition including a particulate metal oxide-containing solid coated with a reaction product of an amine and a phosphate ester/acid, where the coating is deformable.

The present invention provides a substrate having surfaces partially or completed coated with a composition of this invention comprising a reaction product of an amine and a phosphate ester/acid, where the coating is deformable and where the substrate is ideally suited for filtering fines and/or other particulate materials form a fluid, especially fluids used in oil/gas well drilling, completion, production, fracturing, propping, other production enhancing processes or other related applications. The structures can be ceramic or ceramic fibers or wools coated partially or completely with the compositions of this invention. Such structures are well suited for filter media to be used with or without screens.

Method for Treating

The present invention provides a method for changing an aggregation potential or propensity of a particulate solid material such as a metal oxide-containing solid, where the method includes the step of contacting the particulate solid material with a composition including an amine and a phosphate ester/acid under conditions sufficient for the amine and phosphate ester/acid to react forming a partial or complete coatings on surfaces of particulate solid material.

Methods for Using the Treating Methods

Fracturing

The present invention provides a method for fracturing a formation including the step of pumping a fracturing fluid including a proppant into a producing formation at a pressure sufficient to fracture the formation and to enhance productivity, where the proppant props open the formation after fracturing and where the proppant comprises a particulate solid treated with a treating composition comprising an amine and a phosphate ester/acid under conditions sufficient for the amine and phosphate ester/acid to react forming a partial or complete coating on surfaces of particulate solid material.

The present invention provides a method for fracturing a formation including the step of pumping a fracturing fluid including a proppant and an aggregating composition of this invention into a producing formation at a pressure sufficient to fracture the formation and to enhance productivity. The composition results in a modification of an aggregation propensity, and/or zeta-potential of the proppant, formation particles and formation surfaces so that the formation particles and/or proppant aggregate and/or cling to the formation surfaces.

The present invention provides a method for fracturing a formation including the step of pumping a fracturing fluid including an aggregating composition of this invention into a producing formation at a pressure sufficient to fracture the formation and to enhance productivity. The composition results in a modification of an aggregation propensity, potential and/or zeta-potential of the formation particles and formation surfaces so that the formation particles aggregate and/or cling to the formation surfaces. The method can also include the step of pumping a proppant comprising a coated particulate solid composition of this invention after fracturing so that the coated particles prop open the fracture formation and tend to aggregate to the formation surfaces and/or formation particles formed during fracturing.

Drilling

The present invention provides a method for drilling including the step of while drilling, circulating a drilling fluid, to provide bit lubrication, heat removal and cutting removal, where the drilling fluid includes an aggregating composition of this invention. The composition increases an aggregation potential or propensity and/or alters a zeta potential of any particulate metal oxide-containing solid in the drilling fluid or that becomes entrained in the drilling fluid to increase solids removal. The method can be operated in over-pressure conditions or under-balanced conditions or under managed pressure conditions. The method is especially well tailored to under-balanced or managed pressure conditions.

The present invention provides a method for drilling including the step of while drilling, circulating a first drilling fluid to provide bit lubrication, heat removal and cutting removal. Upon encountering an underground structure that produces undesirable quantities of particulate solids, changing the first drilling fluid to a second drilling fluid including a composition of this invention to provide bit lubrication, heat removal and cutting removal and to increase an aggregation potential or decrease the absolute value of the zeta potential of any particulate solids in the drilling fluid or that becomes entrained in the drilling fluid to increase solids removal. The method can be operated in over-pressure conditions or under-balanced conditions or under managed pressure conditions. The method is especially well tailored to under-balanced or managed pressure conditions.

The present invention provides a method for drilling including the step of while drilling, circulating a first drilling fluid to provide bit lubrication, heat removal and cutting removal. Upon encountering an underground structure that produces undesirable quantities of particulate solids, changing the first drilling fluid to a second drilling fluid including a composition of this invention to provide bit lubrication, heat removal and cutting removal and to increase an aggregation potential or decrease in the absolute value of the zeta potential of any particulate solids in the drilling fluid or that becomes entrained in the drilling fluid to increase solids removal. After passing through the structure that produces an undesired quantities of particulate solids, change the second drilling fluid to the first drilling fluid or a third drilling fluid. The method can be operated in over-pressure conditions or under-balanced conditions or under managed pressure conditions. The method is especially well tailored to under-balanced or managed pressure conditions.

Producing

The present invention provides a method for producing including the step of circulating and/or pumping a fluid into a well on production, where the fluid includes a composition of this invention, which increases an aggregation potential or decreases the absolute value of the zeta potential of any particulate solid in the fluid or that becomes entrained in the fluid to increase solid particle removal and to decrease the potential of the particles to plug the formation and/or the production tubing.

The present invention also provides a method for controlling sand or fines migration including the step of pumping a fluid including a composition of this invention through a matrix at a rate and pressure into a formation to control sand and fine production or migration into the production fluids.

The present invention also provide another method for controlling sand or fines migration including the step of depositing a coated particulate solid material of this invention adjacent screen-type sand and fines control devices so that the sand and/or fines are attracted to the coated particles and do not encounter or foul the screen of the screen-type device.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
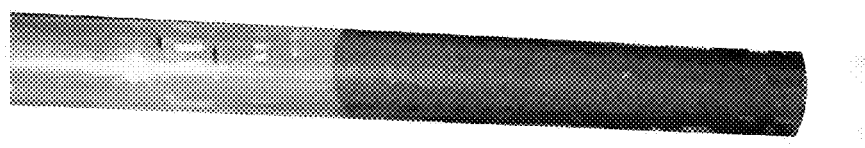
FIG. 1 is a photograph depicting a untreated sand pack and sand packs treated with 5% v/w of aggregating compositions designated SG-5 and SG-1, respectively.
Figure 1:
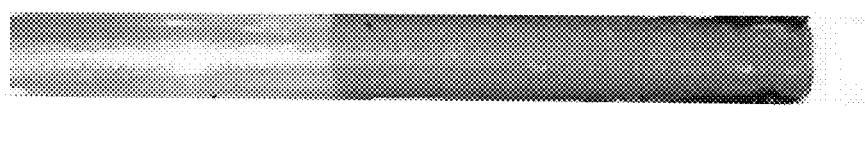
Figure 1:
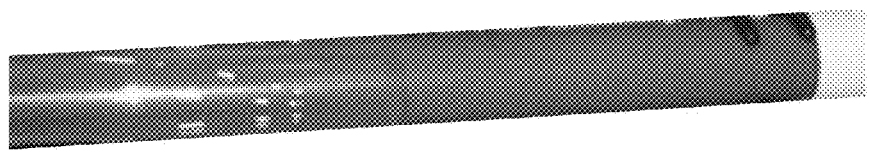

The inventors have found that a composition can be produced that, when added to a particulate metal-oxide-containing solid or other solid materials or to a suspension or dispersion including a particulate metal-oxide-containing solid or other solid materials, the particles are modified so that an aggregation propensity, aggregation potential and/or a zeta potential of the particles are altered. The inventors have also found that metal-oxide-containing solid particles or other solid particles can be prepared having modified surfaces or portions thereof, where the modified particles have improved aggregation tendencies and/or propensities and/or alter particle zeta potentials. The inventors have also found that the compositions and/or the modified metal-oxide-containing solid or other solid particles can be used in oil field applications including drilling, fracturing, producing, injecting, sand control, or any other downhold application. The inventors have also found that the modified particulate metal-oxide-containing solid particles or particles of any other solid material can be used any other application where increased particle aggregation potentials are desirable or where decreased absolute values of the zeta potential of the particles, which is a measure of aggregation propensity. The inventors have also found that a coated particulate metal-oxide-containing solid compositions can be formed, where the coating is deformable and the coated particles tend to self-aggregate and tend to cling to surfaces having similar coatings or having similar chemical and/or physical properties to that of the coating. That is to say, that the coated particles tend to prefer like compositions, which increase their self-aggregation propensity and increase their ability to adhere to surface that have similar chemical and/or physical properties. The inventors have found that the coating compositions of this invention are distinct from known compositions for modifying particle aggregation propensities and that the coated particles are ideally suited as proppants, where the particles have altered zeta potentials that change the charge on the particles causing them to attract and agglomerate. The change in zeta potential or aggregation propensity causes each particle to have an increased frictional drag keeping the proppant in the fracture. The compositions are also ideally suited for decreasing fines migrating into a fracture pack or to decrease the adverse impact of fines migration into a fractured pack.

New Disclosure

The use of aggregating systems of proppant that when added to water/gel solutions and pumped downhole beside coating the proppant it will also coat surfaces formation changing the wettability more towards neutral values. This effect changes the conditions of water entrapped so water could be displaced permanently more in a piston-like manner resulting.

Basically the difference of this approach to the current use of microemulsions is that this solution uses among other systems alkyl pyridinium phosphate ester that coat in a more permanent way any metal oxide surface than the small oil layer that coats circumstantially the metal oxide systems.

Original Disclosure

In the case of drilling, the compositions of this invention can be used to coat the formation and formation cuttings during drilling, because the particle tend to self aggregate and/or cling to similar modified formation surfaces. Again, an advantage of the self-aggregation is a reduced tendency of the cuttings to foul or plug screens. Additional advantages are to coat the formation walls with a composition of this invention during drilling to consolidate the formation and to consolidate or aggregate fines or particles in the drilling fluid to keep the Theological properties of the drilling fluid from changing and increasing equivalent circulating density (ECD).

Compositions

The invention broadly relates to a composition including an amine and a phosphate ester/acid. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Treated Structures and Substrates

The present invention also broadly relates to structures and substrates treated with a composition of this invention, where the structures and substrates include surfaces that are partially or completely coated with a composition of this invention. The structures or substrates can be ceramic or metallic or fibrous. The structures or substrates can be spun such as a glass wool or steel wool or can be honeycombed like catalytic converters or the like that include channels that force fluid to flow through tortured paths so that particles in the fluid are forced in contact with the substrate or structured surfaces. Such structures or substrates are ideally suited as particulate filters or sand control media.

Methods for Treating Particulate Solids

The present invention broadly relates to a method for treating metal oxide-containing surfaces including the step of contacting the metal oxide-containing surface with a composition of this invention. The composition forms a coating on the surface altering the properties of the surface so that the surface is now capable to interacting with similarly treated surfaces to form agglomerated and/or aggregated structures. The treating can be designed to coat continuous metal oxide containing surfaces and/or the surfaces of metal oxide containing particles. If both are treated, then the particles cannot only self-aggregate, but the particles can also aggregate, agglomerate and/or cling to the coated continuous surfaces. The compositions can be used in fracturing fluids, in drilling fluids, in completion fluids, in sand control applications or any other downhole application. Additionally, the coated particles can be used in fracturing fluids. Moreover, structures, screens or filters coated with the compositions of this invention can be used to attract and remove fines that have been modified with the compositions of this invention.

Method for Fracturing and/or Propping

The present invention broadly relates to methods for fracturing a formation including the step of pumping a fracturing fluid including a composition of this invention into a producing formation at a pressure sufficient to fracture the formation. The composition modifies an aggregation potential and/or zeta-potential of formation particles and formation surfaces during fracturing so that the formation particles aggregate and/or cling to the formation surfaces or each other increasing fracturing efficiency and increasing productivity of the fracture formation. The composition of this invention can also be used in a pre-pad step to modify the surfaces of the formation so that during fracturing the formation surfaces are pre-coated. The prepad step involves pumping a fluid into the formation ahead of the treatment to initiate the fracture and to expose the formation face with fluids designed to protect the formation. Beside just using the composition as part of the fracturing fluid, the fracturing fluid can also include particles that have been prior treated with the composition of this invention, where the treated particles act as proppants to prop open the formation after fracturing. If the fracturing fluid also includes the composition, then the coated particle proppant will adhere to formation surfaces to a greater degree than would uncoated particle proppant.

In an alternate embodiment of this invention, the fracturing fluid includes particles coated with a composition of this invention as proppant. In this embodiment, the particles have a greater self-aggregation propensity and will tend to aggregate in locations that may most need to be propped open. In all fracturing applications including proppants coated with or that become coated with the composition of this invention during fracturing, the coated proppants are likely to have improved formation penetration and adherence properties. These greater penetration and adherence or adhesion properties are due not only to a difference in the surface chemistry of the particles relative to the surface chemistry of un-treated particles, but also due to a deformability of the coating itself. Thus, the inventors believe that as the particles are being forced into the formation, the coating will deform to allow the particles to penetrate into a position and as the pressure is removed the particles will tend to remain in place due to the coating interaction with the surface and due to the relaxation of the deformed coating. In addition, the inventors believe that the altered aggregation propensity of the particles will increase proppant particle density in regions of the formation most susceptible to proppant penetration resulting in an enhance degree of formation propping.

Method for Drilling

The present invention also broadly relates to a method for drilling including the step of while drilling, circulating a drilling fluid to provide bit lubrication, heat removal and cutting removal, where the drill fluid includes a composition of this invention, which increases an aggregation potential or decrease an absolute value of the zeta potential of any particulate solids in the drilling fluid or that becomes entrained in the drilling fluid to increase solids removal.

The present invention also broadly relates to a method for drilling including the step of while drilling, circulating a first drilling fluid to provide bit lubrication, heat removal and cutting removal. Upon encountering an underground structure that produces undesirable quantities of particulate solids including metal oxide-containing solids, changing the first drilling fluid for a second drilling fluid including a composition of this invention to provide bit lubrication, heat removal and cutting removal and to increase an aggregation potential or decrease an absolute value of the zeta potential of any solid including particulate metal oxide-containing solids in the drilling fluid or that becomes entrained in the drilling fluid to increase solids removal.

The present invention also broadly relates to a method for drilling including the step of while drilling, circulating a first drilling fluid to provide bit lubrication, heat removal and cutting removal. Upon encountering an underground structure that produces undesirable quantities of particulate solids including metal oxide-containing solids, changing the first drilling fluid for a second drilling fluid including a composition of this invention to provide bit lubrication, heat removal and cutting removal and to increase an aggregation potential or zeta potential of any particulate solid including metal oxide-containing solid in the drilling fluid or that becomes entrained in the drilling fluid to increase solids removal. After passing through the structure that produces an undesired quantities of particulate metal oxide-containing solids, change the second drilling fluid for the first drilling fluid or a third drilling fluid.

Method for Producing

The present invention also broadly relates to a method for producing including the step of circulating and/or pumping a fluid into, where the fluid includes a composition of this invention, which increases an aggregation potential or decreases an absolute value of the zeta potential of any particulate solid including a metal oxide-containing solid in the fluid or that becomes entrained in the fluid to increase solids removal and to decrease the potential of the particles plugging the formation and/or production tubing.

Suitable Agents

Suitable amines include, without limitation, any amine that is capable of reacting with a suitable phosphate ester/acid to form a composition that forms a deformable coating on a metal-oxide-containing surface. Exemplary examples of such amines include, without limitation, any amine of the general formula $R^1$, $R^2NH$ or mixtures or combinations thereof, where $R^1$ and $R^2$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Suitable phosphate containing compound include, without limitation, any phosphate acid and/or any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)_y$ where $x+y=3$ and $R^6$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbenzyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate. Exemplary phosphate acids include phosphoric acid, polyphosphoric acid or mixtures thereof.

Suitable solid materials suitable for being coated with the compositions of this invention include, without limitation, metal oxides and/or ceramics, natural or synthetic, metals, plastics and/or other polymeric solids, solid materials derived from plants, or any other solid material that does or may find use in downhole applications or mixtures or combinations thereof. Metal oxides including any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

EXPERIMENTS OF THE INVENTION

Example 1

This example illustrates general procedures used in the preparation and testing of sand treated with an aggregating composition of this invention.

700 grams of 20/40 sand were pallet mixed at 1000 rpm in distilled water including 2 wt. % KCl at a sand to solution concentration of 1 lb/gal for 15 minutes. An aggregating composition of this invention was then added to the sand slurry in a concentration ranging from 0 to 8 gptg. The resulting slurry was mixed for 15 minutes at 1000 rpm. The treated sand slurry was then poured into a PVC flow rate cylinder and flushed with at least 5 volumes of fresh 2 wt. KCl. The flow rate of the 2 wt. % KCl solution was then measured through the resulting treated sand pack.

Example 2

This example illustrates the other set of general procedures used in the preparation and testing of sand treated with an aggregating compositions of this invention.

700 grams of 20/40 sand was pre-treated with an aggregating composition of this invention at concentration of 1.5, 3.0 and 5.0% v/w. The composition was stirred into the dry sand using a spatula for 5 minutes. After dry mixing, a 2.0 wt. % KCl solution was added with stirring. The resulting slurry of treated sand was poured into a PVC flow rate cylinder and washed with at least 5 volumes of 2.0 wt. % KCl. The flow rate of the 2 wt. % KCl solution was then measured through the sand pack.

The following aggregating compositions were prepared and test according to the procedures described in Examples 1 and 2.

| Components | wt. % |
|---|---|
| SG-1 | |
| Akolidine 11 (mixture of alkyl pyridines from Lonza, Inc. of NJ) | 42.46 |
| Phosphate Ester formed from 54 wt. % polyphosphoric acid, 32 wt. % triethanolamine and 14.18 wt. % water | 13.31 |
| Methanol | 44.23 |
| SG-2 | |
| Benzyl Quaternary of Coconut Amide | 13.83 |
| Genamin T150 (Ethoxylated Amine) | 10.35 |
| Nonylphenyl Phosphate Ester | 5.22 |
| Crude Tall Oil | 3.15 |
| Quaternary Ammonium Chloride | 57.45 |
| Demulsifier (CIM 940) | 9 |
| Alkyl Phenol Resin Oxyalkaline (DRC 168) | 1 |
| SG-3 | |
| Benzyl Quaternary of Coconut Amide | 15.37 |
| Genamin T150 (Ethoxylated Amine) | 11.5 |
| Nonylphenyl Phosphate Ester | 5.8 |
| Crude Tall Oil | 3.5 |
| Quaternary Ammonium Chloride formed from 49 wt. % Akolidine 11 (mixture of alkyl pyridines from Lonza, Inc.), 25 wt. % Benzyl chloride and 26.08 wt. % methanol | 63.83 |
| SG-4 | |
| Quaternary Ammonium Chloride formed from 49 wt. % Akolidine 11 (mixture of alkyl pyridines from Lonza, Inc.), 25 wt. % Benzyl chloride and 26.08 wt. % methanol | 42.26 |
| Phosphate Ester formed from 54 wt. % polyphosphoric acid, 32 wt. % triethanolamine and 14.18 wt. % water | 13.31 |
| Methanol | 44.23 |
| SG-5 | |
| SG-2 | 42.46 |
| Methanol | 44.23 |
| Phosphate Ester formed from 54 wt. % polyphosphoric acid, 32 wt. % triethanolamine and 14.18 wt. % water | 13.31 |

Zeta Potential Measurements

The Zeta potential is defined by the charge that develops at the interface between solid surfaces. Zeta potential is therefore a function of the surface charge of the particle, any adsorbed layer at the interface, and the nature and composition of the surrounding suspension medium. In other words Zeta potential can be affected by (1) changes in pH, (2) conductivity of the medium (Salinity and kind of salt), and (3) concentration of particular additives (polymer, non-ionic surfactants etc.).

In order to get the Zeta Potential using the Zetasizer (Nano) Z of Malvern by microelectrophoresis the system needs to have solids or colloids in the range between 3 nm and 20 µm. To characterize the influence of different additives in the system, Silica Flour was used instead of sand 20/40.

The amount of silica powder was set at 0.25 ppg in order to decrease the settling effects during the tests measurements. On the other hand, the only way to get well defined peaks (as narrow as possible) was to add KCl in concentrations of 0.5% or less.

Table 1 show the results of the influence of the additive SG-1 on the measured Zeta Potential values when the additive was added to a Silica Flour slurry with mixed. It was found that Zeta Potential values varied with time indicating that increased exposure time allows the additive to absorbs on the particle. Although the measured Zeta Potential values were well in the range between −30 and 30 mV the measures were not considered reliable when the standard deviation were higher than 250 mV.

TABLE 1

Zeta Potentials of SG-1 Treated Sand

| SG-1 Concentration (pptg) | Mean Zeta Potential (mV) | Zeta Potential deviation (mV) |
|---|---|---|
| 0 | −47.8 | 38.1 |
| 2 | 4.13 | 377.6* |
| 4 | −0.6 | 276.9* |
| 6 | 2.52 | 419.4* |

*The phase behavior of Zeta-Potential measurements were not good enough giving high Zeta potential deviation. Final pH 6.16-6.22

Flow Tests Through Sand Pack

It was determined the influence of the sand grip additives in the flow of 2% KCl solution through a 20/40 pretreated sand. Table 2 shows no effect pre-treating the sand with SG-1 in the in flowing of 2% KCl brine.

TABLE 2

Sand Flow Rate Measurements Through SG-1 Treated Sand

| SG-1 Concentration (gptg) | Average flow rate (ml/min) | Flow rate ratio (Treat./N-Treat.) |
|---|---|---|
| 0 | 387 | 1.00 |
| 2 | 461 | 1.03 |
| 4 | 419 | 1.08 |
| 8 | 408 | 1.05 |

Effect of Pre-Treating the Sand in Dry Conditions

It was determined the influence of the aggregating additives in the flow of 2% KCl solution through a 20/40 pretreated sand. In this case the sand was pre-treated in dry before being mixed with the 2.0% KCl Solution. The sand slurry was then poured into a plastic cylinder and after being washed with 5 volumes of 2% KCl solution. The flow rate through the sand pack was then determined using the brine solution.

Table 3 shows the effect of additives SG-1 to SG-5 in the brine flow when added to dry sand at concentration of 5% v/w. In this case it was observed that only the sand pretreated with SG-1 and SG-5 showed a clear immediate increase in the flow rate through the sand system. When treated the sand in dry with 5% v/w of SG-1 and SG-5 it was also observed a clear increase in the sand pack height as shown in FIG. 1.

Figure 2:
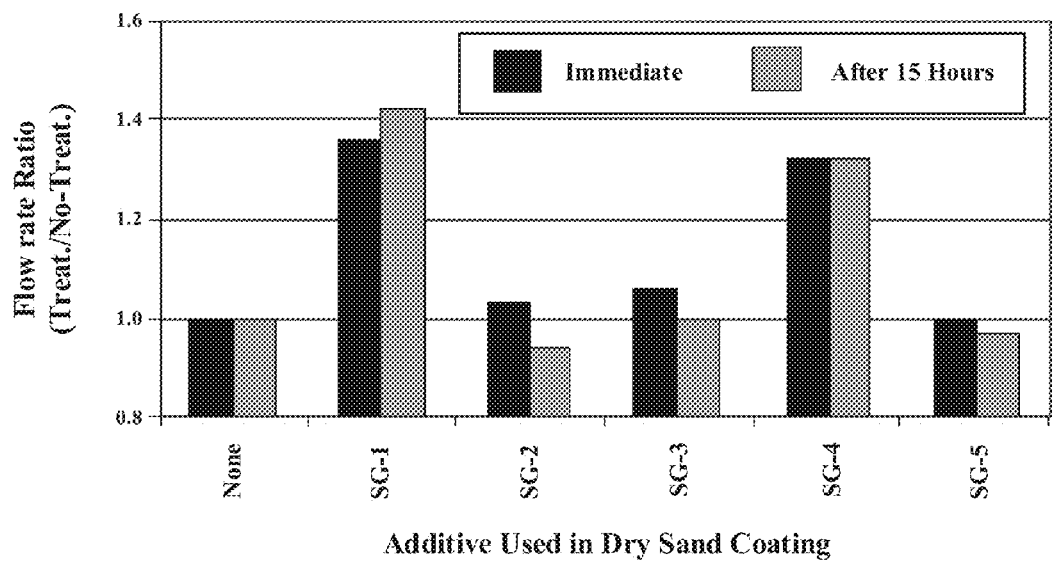
FIG. 2 depicts a chart of flow rate ratio of 2 wt. % KCl brine through an untreated sand pack and sand packs treated with 5% v/w of ten aggregating compositions of this invention designated SG-1 through SG-5.

Referring now to FIG. 2, treating the sand with 5% v/w of SG-1 and SG-4 showed an appreciable increase in the flow rate of 2% KCl solution after initially and after 15 hours of treatment compared to the untreated sand. Treatment with SG-2, SG-3 and SG-5 show little difference in the flow rate ratio compared to the untreated sand.

Figure 3:
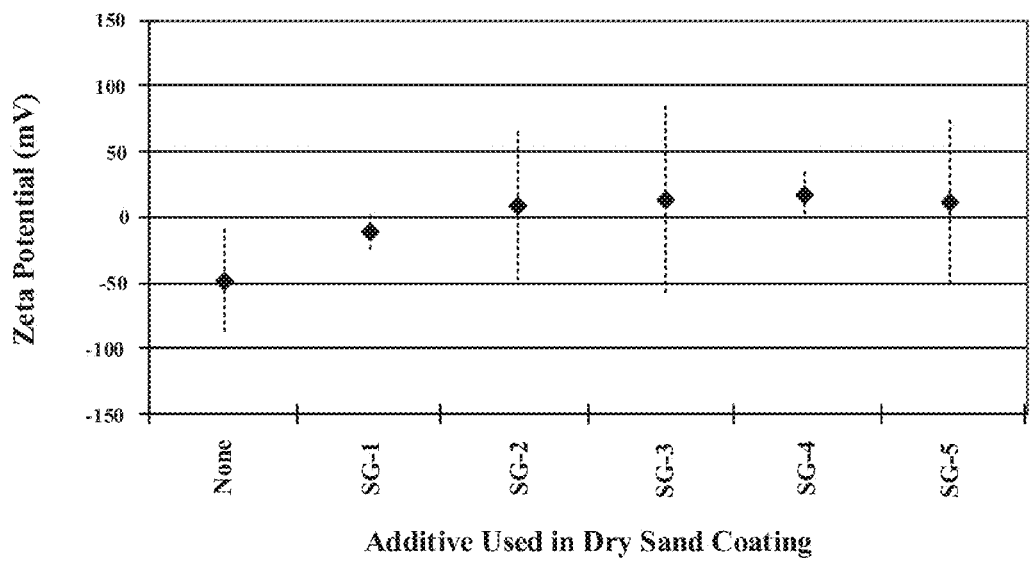
FIG. 3 depicts a graph of Zeta potential mean and deviation values of untreated silica flour and silica flour treated with 5% v/w of ten aggregating compositions of this invention designated SG-1 through SG-5, where thetinal Silica flour concentration was 0.25 ppg in 0.5 wt. % KCl brine.

Referring now to FIG. 3, the changes in the Zeta Potential with the addition of SG-1 to SG-5 are shown when added to dry silica flour and later measured in a 0.25 ppg of silica flour in 0.5% KCl solution. In this case as it was expected, SG-1 and SG-4 not only show Zeta Potential values between 20 and −20 mV, but also the lowest standard deviation in the measurement.

TABLE 3

Flow Rate Measurements Through Pre-treated Sand

| Treating Agent | Average Flow Rate immediate (after 15 h) (mL/min) | Flow Rate Ratio treated/untreated immediate (after 15 h) | Zeta Potential[‡] (mV) | Observation |
|---|---|---|---|---|
| Control | 352 (352) | 1.00 (1.00) | −47.85 ± 38.19 | |
| SG-1 | 480 (500) | 1.36 (1.42) | −11.72 ± 13.81 | increase in pack height |
| SG-2 | 367 (333) | 1.03 (0.94) | 9.9 ± 55.5 | |
| SG-3 | 375 (353) | 1.06 (1.00) | 13.28 ± 71.83 | |
| SG-4 | 467 (467) | 1.32 (1.32) | 17.72 ± 15.99 | increase in pack height |
| SG-5 | 352 (342) | 1.00 (0.97) | 11.28 ± 61.75 | |

[‡]In 0.25 ppg of Silica Flour and 0.5% KCl solution

New Experimental Section

Purpose

We have evaluated load recovery properties through sand pack and core flooding tests using commercial and experimental microemulsions, fluorosurfactants as well as Additive 1.

Additive 1

Additive 1 is a composition comprising the following list of components in the indicated amounts as show in Table 4.

TABLE 4

Ingredients and Weight Percentages for Additive 1

| Components | wt. % |
| --- | --- |
| Akolidine 11[†] | 59.0 |
| Phosphate Ester[‡] | 8.3 |
| Methanol | 32.7 |

[†]mixture of alkyl pyridines available from Lonza, Inc. of NJ
[‡]Reaction product of 78.50 wt. % polyphosphoric acid and 21.50 wt. % tri-ethanol amine Additive 1 is similar in composition to SG-1 set forth above.

The results have been used to correlate changes in the contact angle in the Berea Sandstone as well as measured surface tension to the type of treating composition being used.

Background

The injection of aqueous solutions during stimulation treatments, whether under matrix stimulation or fracturing conditions, will increase water saturations and reduce the relative permeability to oil/gas in the invaded zone of the treated reservoir. Returning the oil/gas permeability to initial values depends on how efficiently the invading fluids can be cleaned up. Historically, surfactants have been added to stimulation treatments to accelerate fluid recovery and minimize relative permeability damage. The effectiveness of draw down and/or recovery of oil/gas have been shown to depend directly on the magnitude of the capillary pressure. The data indicates that the lower the capillary pressure, the higher will be the load recovery.

In gas well, the capillary pressure ($P_c$) can be defined by LaPlace-Young equation:

$$P_c = \frac{2\sigma \cos\theta}{R_c}$$

where $\sigma$ is the liquid vapor interfacial tension (surface tension), $\theta$ is the contact angle between the liquid and the solid surface and $R_c$ is the ratio of curvature within a porous matrix.

In order to decrease the capillary pressure in gas wells, historically, the variable of surface tension has been lowered to 20-30 dynes/cm by using conventional hydrocarbon surfactant and fluorosurfactants. Recently, focus has turned to the use of microemulsion or wetting systems which are designed to alter the contact angle between the substrate (mostly silicate) and injected water closer to 90 degrees so water could be displaced more in a piston-like manner resulting in decreasing water saturation and getting higher relative gas permeability.

CONCLUSIONS

Of the 18 commercially and experimental load recovery systems, Additive 1 and Microemulsion WNE-348LN gave the highest flow of brine through 20/40 mesh sand pack, the highest relative permeability at different porous volume of injected gas in 50 mD Berea Sandstone and the higher porous volumes of liquid collected in the core flooding tests.

Evaluations of treatment of Berea Sandstone with Additive 1 increased the contact angle to 56.8°, while when treating Berea Sandstone with WNE-348LN increased the contact angle to only 30.3°. Contact angle of the untreated core was 18.5°.

Additive 1 changes the contact angle of formation surfaces to a wettability value that is closer to a neutral wettability value than the surfaces would have in the absence of being treated with Additive 1. This change in wettability value towards a neutral wettability value is accompanied by an increase in gas production, in a decrease in water blocking and in improved load recovery of a formation after a fracturing operation. Reaction products of this invention, such as Additive 1, form deformable coating, complete or partial, on formation surfaces changing the contact angle values, wettability values, zeta potential values and other related properties of the surface. These changed properties not only permit improve gas and water production, the surface tend to attract particulate, fines, and proppants, with or without prior treatment with the reaction products, so that the particulate, fines and/or proppants cling to the surfaces of the formation reducing particulate (sand), fines, and/or proppants migration acting as a sand control treatment, while concurrently improving water and gas flowability through the formation and into production fluids and production tubing.

Procedure

Tests Though Sand Pack

Treated and un-treated sand were tested by mixing 700 grams of 20/40 Badger sand in slurries with concentrations between 0.5 and 3 gal/Mgal of the load recovery additive in 2% KCl in salt water.

The sand was poured into a clear PVC plastic cylinder (1.5 inch inner diameter and 22 inches long), where at the other end a slotted plaque allows only liquid and fines to pass through.

After being washed with at least 10 porous volumes of 2% KCl, the flow rates by gravity through sand pack were compared of different test treatments.

Core Flooding Tests

Core tests were conducted in Berea Sand Stone cores of permeability to $N_2$ of 50-55 mD. The core same was 1.5 inches diameter and 3.5 inches long.

The tests were started by measuring permeability to brine at a flow rate of 120 cc/min until 5 porous volume were collected and checking the Darcy Flow regime.

Flow of nitrogen was started with a differential pressure of 10 psi recording liquid collected in the other end of the core as well as gas flow rate for two hours.

Liquid saturation was then reestablished, when injecting 5 porous volume of the treated brine with the load recovering agent.

Flow of nitrogen was then re-started with a differential pressure of 10 psi measuring collected liquid and gas flow rate in the other end of the core.

In all the tests, the overburden pressure was set in the radial and axial direction of 1000 psi and the temperature at 70° F.

Determination of Surface Tension/Contact Angle

Contact angle and surface tension were determined.

Saturation Restoration

In preparation for the wettability measurement, the Berea plug samples were saturated with a representative formation fluid. In this study, a 3% KCL solution was selected as the representative or control fluid.

To ensure the complete saturation of the samples, the selected cores were placed in a pressure chamber with multiple access ports. One of the ports was connected to a vacuum source, while a second port was connected to the saturation fluid source. This air tight pressure vessel was put under vacuum for 8 hours to ensure that all air was removed from the vessel. After the 8 hours of evacuation time, a prepared saturation fluid was allowed to fill the pressure vessel. Once the pressure vessel was filled with the saturation fluid, the liquid pressure was increased slowly to 1000 psig and allowed to stabilize under pressure for 4 hours. At the end of this stabilization time, the pressure in the chamber was reduced slowly and once de-pressurized; the samples were removed and stored under the saturation fluid until testing is to be conducted.

Contact Angle/IFT Measurement Equipment

Contact angle and/or surface tension (IFT) measurements were conducted with a Kruss DSA 100 apparatus. This apparatus was equipped with proprietary software to capture contact angle and IFT data. The range and accuracy of the contact angle measurement are from 0° to 180° with a resolution of +/−0.1. The IFT measurements ranged from $1\times10^{-2}$ to 100 mN/m with a resolution of 0.01 mN/m. Digital imaging was also provided from this equipment.

Contact Angle Measurement

For this study, the contact angle measurements were performed at 20° C. The following procedures were used in the measurements of contact angles: (1) a pre-test calibration of the DSA 100 apparatus was conducted; (2) place the saturated core plug in a non-reflective, non-distorting glass container filled with the saturation fluid or chosen fluid; (3) using a syringe, place a drop of a drop phase fluid (mineral oil) on to a surface of the substrate selected to represent the in situ condition; (4) adjust the zoom and focus of the camera so that a clear unobstructed view was shown on the monitor; and (5) the drop was allowed to stabilize for a short period of time and once the drop became stable, an image of the droplet contact angle was captured and using proprietary software, the contact angle was measured. The contact angle was measured using the Young-Laplace method.

Interfacial Tension Measurement

The Interfacial Tension data for this study were also measured at 20° C. in this study. The surrounding phase for this set of IFT measurements was air. The following procedures were used in the IFT measurements: (1) a pre-test calibration of the DSA 100 apparatus was conducted; (2) using the syringe from the DSA 100 apparatus, a sample drop of the fluid for IFT measurement was injected onto the test surface; (3) adjust the zoom and focus of the camera so that a clear unobstructed view was shown; (4) once the droplet became stable, the parameters of the fluids, drop phase and surrounding phase were entered into the DSA 100 software and along with the captured image of the droplet, the IFT was calculated. The method used for IFT measurements was known as the Pendant prop technique.

Figure 4:
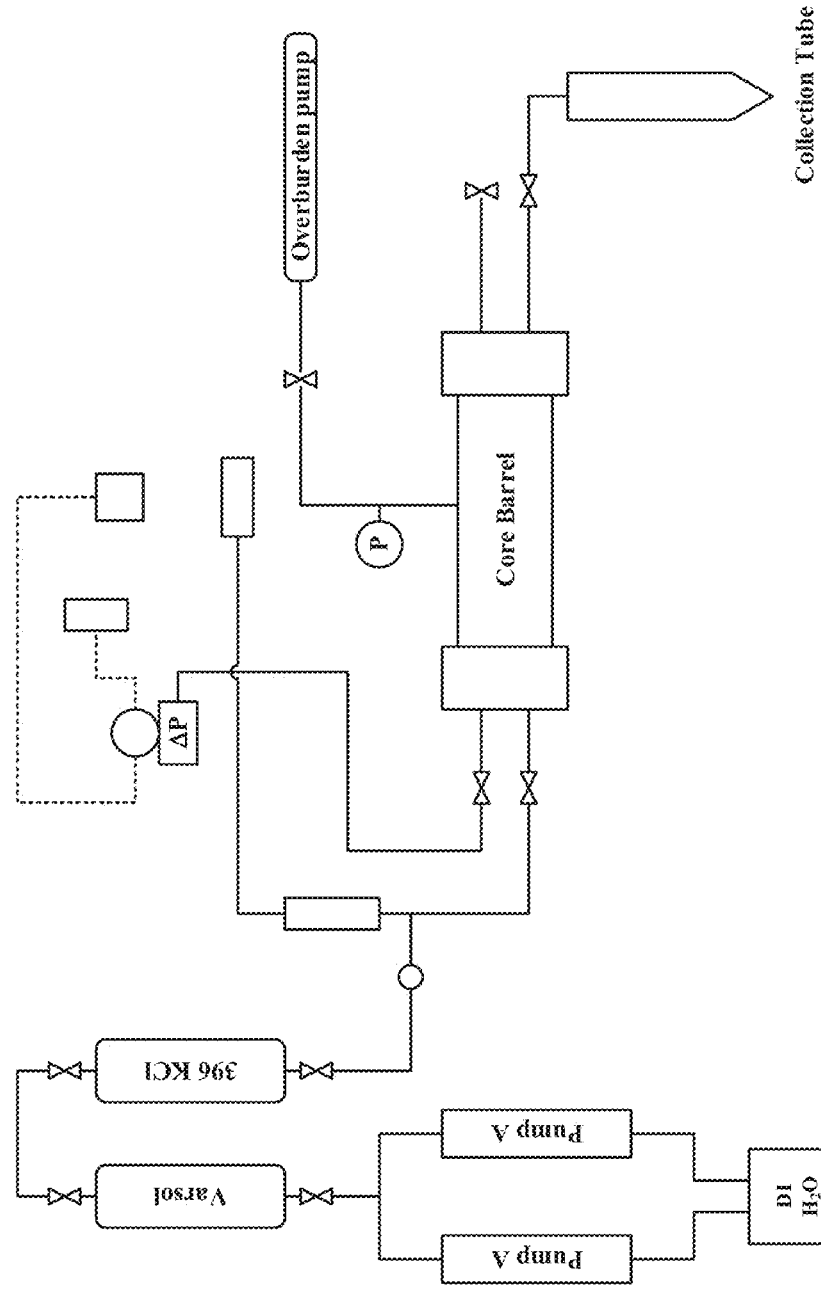
FIG. 4 depicts a diagram of a liquid permeability apparatus used in this invention.
Figure 5:
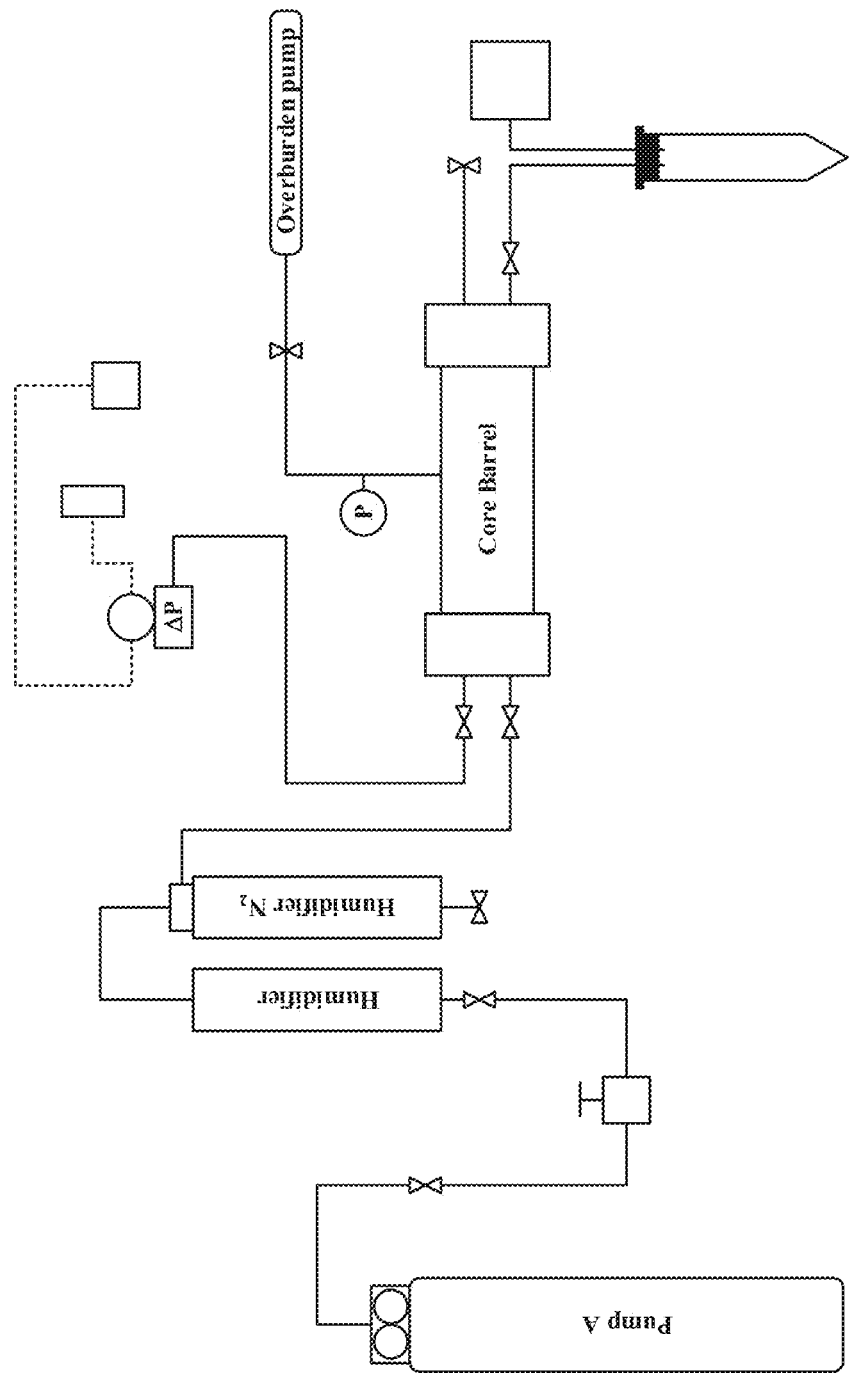
FIG. 5 depicts a diagram of a gas permeability apparatus used in this invention.

Referring to FIG. 4, a diagram of Core Test Apparatus for determining liquid permeability is shown, while FIG. 5, a diagram of Core Test Apparatus for determining gas permeability.

Results

Table 5 compares the effect on the flow rate of 2% KCl through the 20/40 sand pack when pre-treated with 1 gal/Mgal of microemulsions from Magnablend (MB1, MB2, MB3, MB4), micro emulsions from Marchem (W-32, W-32 MB, W-32 MB2) and our, Weatherford's, current commercial product WNE-348LN. After being treated with a load recovery agent of this invention and flushed with 5 porous volume of 2% KCl brine, the only system that showed an increase in the flow rate through the sand pack of 10% or higher was Microemulsion WNE-348LN.

TABLE 5

Comparison of the Flow Rate Through 700 gr (20/30) Sand Pack Column When Using Different Microemulsion Systems When Pre-treated Sand Slurry

| Treatment | $F_i(\%)^\dagger$ | $F_{24}(\%)^\ddagger$ |
| --- | --- | --- |
| Blank (2% Kcl) | 343 mL/min (0%) | 324 mL/min (0%) |
| Blank + 1 gal/Mgal MB1 | 324 mL/min (−6%) | 318 mL/min (−2%) |
| Blank + 1 gal/Mgal MB2 | 327 mL/min (−5%) | 327 mL/min (1%) |
| Blank + 1 gal/Mgal MB3 | 330 mL/min (−4%) | 330 mL/min (2%) |
| Blank + 1 gal/Mgal MB4 | 333 mL/min (−3%) | 290 mL/min (−10%) |
| Blank + 1 gal/Mgal W-32 | 330 mL/min (−4%) | 333 mL/min (3%) |
| Blank + 1 gal/Mgal W-32MB | 318 mL/min (−7%) | 310 mL/min (−4%) |
| Blank + 1 gal/Mgal W-32MB2 | 333 mL/min (−3%) | 343 mL/min (6%) |
| Blank + 1 gal/Mgal WNE-348LN | 387 mL/min (13%) | 371 mL/min (15%) |

$^\dagger$Initial Flow Rate (Percentage increase compared to Untreated)
$^\ddagger$Flow Rate after 24 hours (Percentage increase compared to Untreated)

Table 6 compares the effect on the flow rate of 2% KCl through the 20/40 sand pack when pre-treated with fluorosurfactants from Dupont (Amphoteric Zonyl® FS-500, non-ionic Zonyl® FSH and Ethoxilated non-ionic Zonyl® FSO) and Fluorosurfactant from 3M (Fluoroaliphatic polymer ester FC-4430 and FC-4432). In this case, only when treating with 2 gal/Mgal of FSO was an increase in the flow rate of 10% or above observed compared to the un-treated sand pack.

TABLE 6

Comparison of the Flow Rate Through 700 gr (20/30) Sand Pack Column When Using Different Fluorosurfactant Systems When Pre-treated Sand Slurry

| Treatment | $F_i(\%)^\dagger$ | $F_{24}(\%)^\ddagger$ |
| --- | --- | --- |
| Blank (2% KCl) | 313 mL/min (0%) | 311 mL/min (0%) |
| Blank + 1 gal/Mgal Zonyl FS-500 | 272 mL/min (−13%) | 267 mL/min (−14%) |
| Blank + 1 gal/Mgal Zonyl FSH | 319 mL/min (2%) | 313 mL/min (1%) |
| Blank + 1 gal/Mgal Zonyl FSO | 338 mL/min (8%) | 340 mL/min (9%) |
| Blank + 0.5 gal/Mgal Zonyl FSO | 342 mL/min (9%) | 333 mL/min (7%) |
| Blank + 2 gal/Mgal Zonyl FSO | 368 mL/min (17%) | 370 mL/min (19%) |
| Blank + 1 gal/Mgal FC4430 | 283 mL/min (−10%) | 305 mL/min (−2%) |
| Blank + 1 gal/Mgal FC4432 | 330 mL/min (5%) | 323 mL/min (4%) |

$^\dagger$Initial Flow Rate (Percentage increase compared to Untreated)
$^\ddagger$Flow Rate after 24 hours (Percentage increase compared to Untreated)

Table 7 compares the effect on the flow rate of 2% KCl through the 20/40 sand pack when pre-treated with experimental load recovery agent Additive 1, WEC/GeoSafe experimental surfactants Surf-1 and Surf-3 and WEC experimental microemulsions FreeFlo 1 and Free Flo 2. Additive 1 was the only system that increased the flow through the sand pack above 10%. In fact, the load recovery agents Additive 1 was the system that gave the highest flow rate through the sand pack.

TABLE 7

Comparison of the Flow Rate Through 700 gr (20/30) Sand Pack Column When Using Different WEC/GEOSAFE Experimental Surfactant and Microemulsion Systems

| Treatment | $F_i(\%)$† | $F_{24}(\%)$‡ |
|---|---|---|
| Blank (2% KCl) | 342 mL/min (0%) | 360 mL/min (0%) |
| Blank + 1 gal/Mgal Additive 1 | 431 mL/min (26%) | 454 mL/min (26%) |
| Blank + 1 gal/Mgal Surf 1 | 325 mL/min (−5%) | 342 mL/min (−5%) |
| Blank + 1 gal/Mgal Surf 2 | 325 mL/min (0.95) | 342 mL/min (0.95) |
| Blank + 1 gal/Mgal FreeFlow-1 | 342 mL/min (0%) | 359 mL/min (4%) |
| Blank + 1 gal/Mgal FreeFlow-2 | 340 mL/min (−1%) | 340 mL/min (−6%) |
| Blank + 3 gal/Mgal FreeFlow-2 | 340 mL/min (−1%) | 340 mL/min (−6%) |

†Initial Flow Rate (Percentage increase compared to Untreated)
‡Flow Rate after 24 hours (Percentage increase compared to Untreated)

Figure 6:
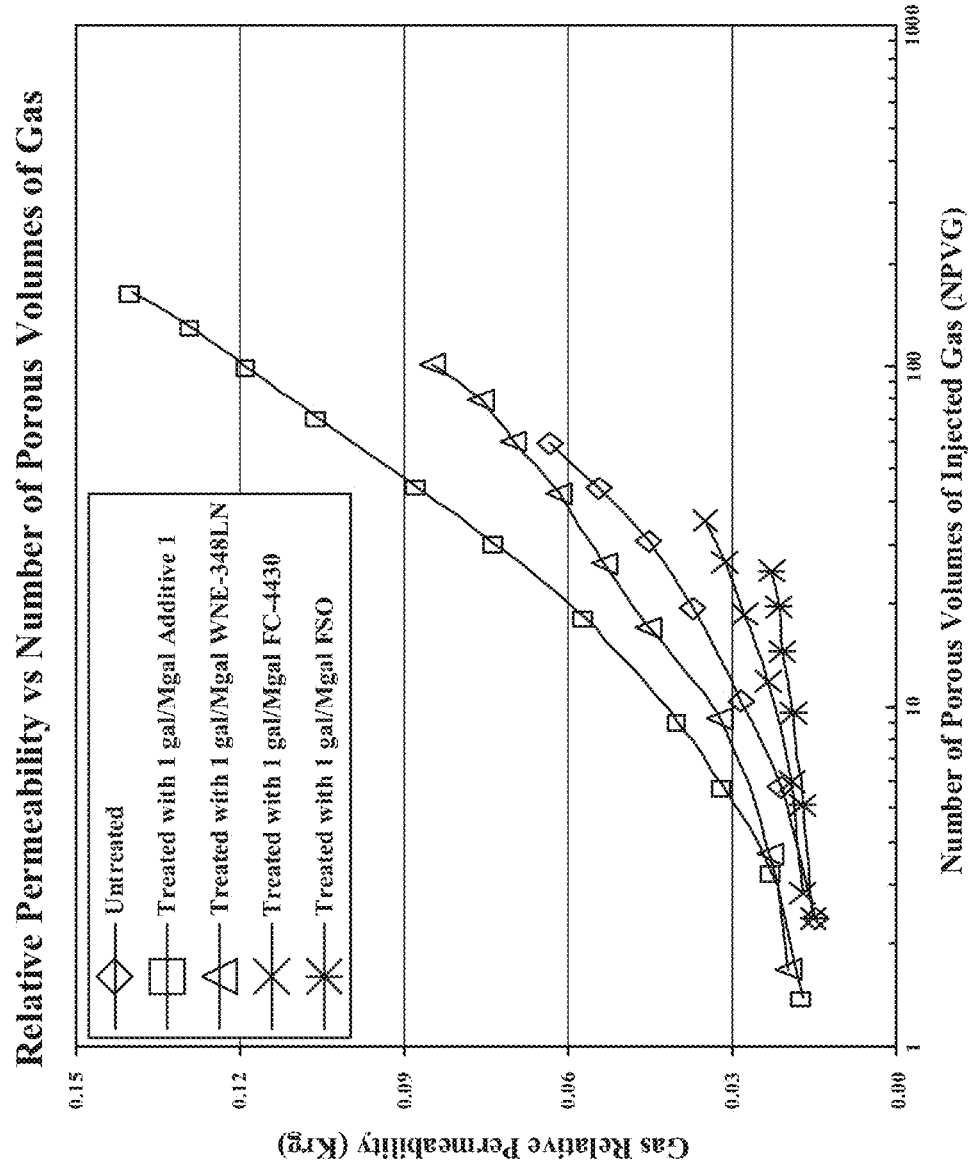
FIG. 6 depicts a plot of relative permeability versus number of porous volumes of gas for various treating compositions.

FIG. 6 shows the results of the changes in gas relative permeability as a function of porous volume of gas injected after being flooded with 5 porous volumes of solutions with 1 gal/Mgal of WNE-348LN, Additive 1, Zonyl® FSO and FC-4430. The three first systems were selected due their good performance in the sand pack while the last additive was selected because is a Fluorosurfactant used by another service company.

When compared to the un-treated cores, treatment with 1 gal/Mgal of WNE-348LN and Additive 1 gave higher relative permeability. Poorer performance was observed when treating the cores with Zonyl® FSO and FC-4430.

Figure 7:
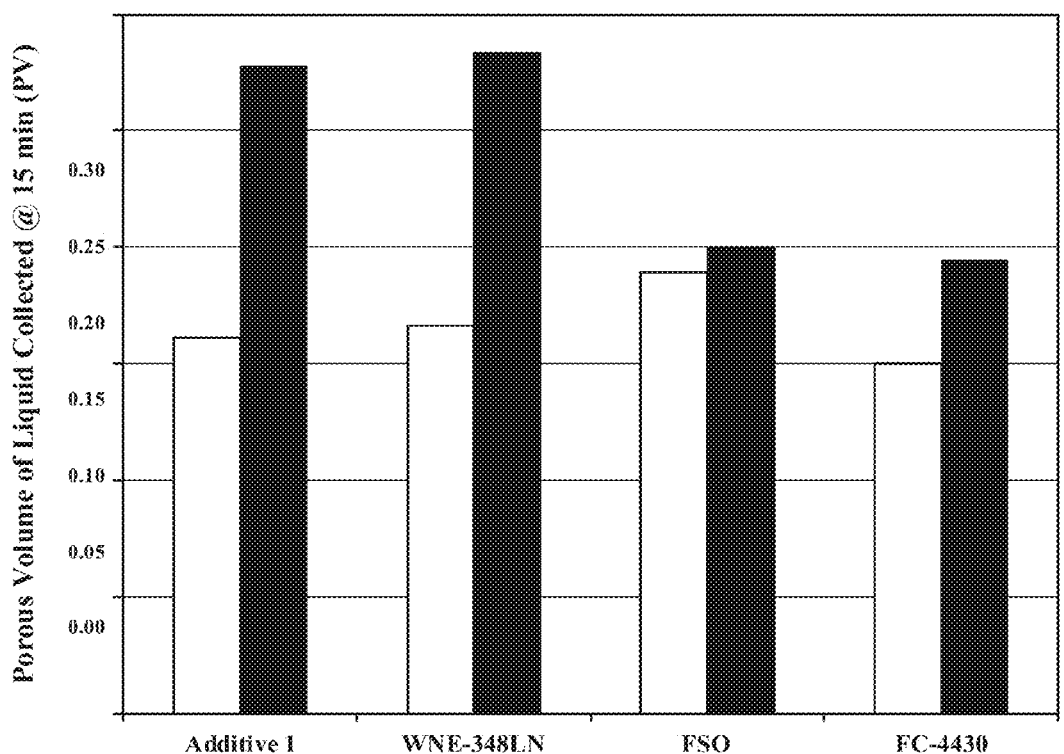
FIG. 7 depicts a plot of liquid removed from core by gas displacement versus number of porous volumes of gas for various treating compositions.

FIG. 7 shows how water displacement during the core tests up to 15 minutes after the permeability testing was performed to test the regain rate of fluid flow. In this case, we observed much higher water recover when the cores were treated with Additive 1 and WNE-348LN, than when the cores were treated with fluorosurfactant Zonyl® FSO and FC-4430. The testing was performed after 15 minutes, because there is no way to determine the amount of liquid lost by evaporation after first break out gas through the core with no back pressure.

Table 8 shows results obtained of the contact angle and surfaces tension when treating Berea Sandstone when treated with Additive 1 and WNE-348LN. In this case, we observed that Additive 1 has higher effect in changing contact angle by increasing it up to 55.8°, while WNE-348LN had higher impact on the surface tension decreasing it down to 29.9 dyn/cm.

TABLE 8

Surface Tension of WNE-348LN and Additive 1 and Contact angle of Injected Water in Berea Sandstone when Untreated and Treated with 1% Solution of Additive 1 and WNE-348LN in 3% KCl Brine

| Berea Sand Stone | Contact Angle (degrees) | Surface Tension (dyn/cm) |
|---|---|---|
| Untreated | 18.5 | 72 |
| Treated with Additive 1 | 55.8 | 40.7 |
| Treated with WNE-348LN | 30.3 | 29.9 |

Figure 8A:
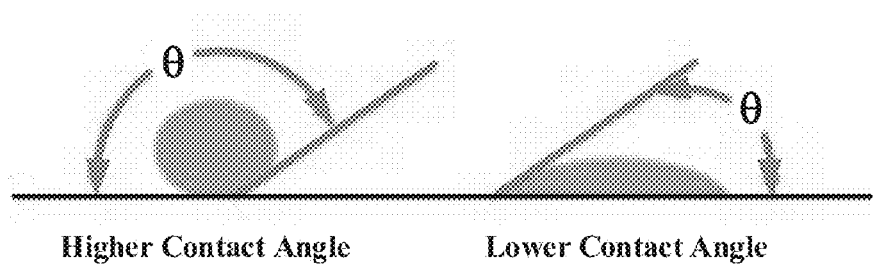
FIGS. 8A&B depicts a diagram of contact angle and droplet configuration and a repeat of the data of Table 7 showing direction of improving properties.
Figure 8B:
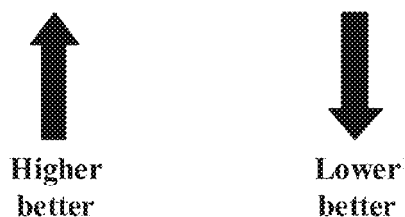

Referring to FIG. 8A, a diagram of contact angle and drop appearance at different contact angles, while FIG. 8B shows the data of Table 8 with arrows indicating the desired direction of improvement for contact angle and surface tension in improving gas permeability and load recovery rates. We observed that the additive of this invention acts as a coating on formation surface changing the contact angle towards the contact angle associated with a neutral value, which improves gas well clean up, by displacing water in a piston-like manner with a final effect in decreasing water saturation and getting higher relative gas permeability. Additive 1 should decrease the capillary pressure by increasing the contact angle up to 56° C. as observed in Berea Sandstone and lowering the surface tension down to 40.7 dynes/cm.

Figure 9:
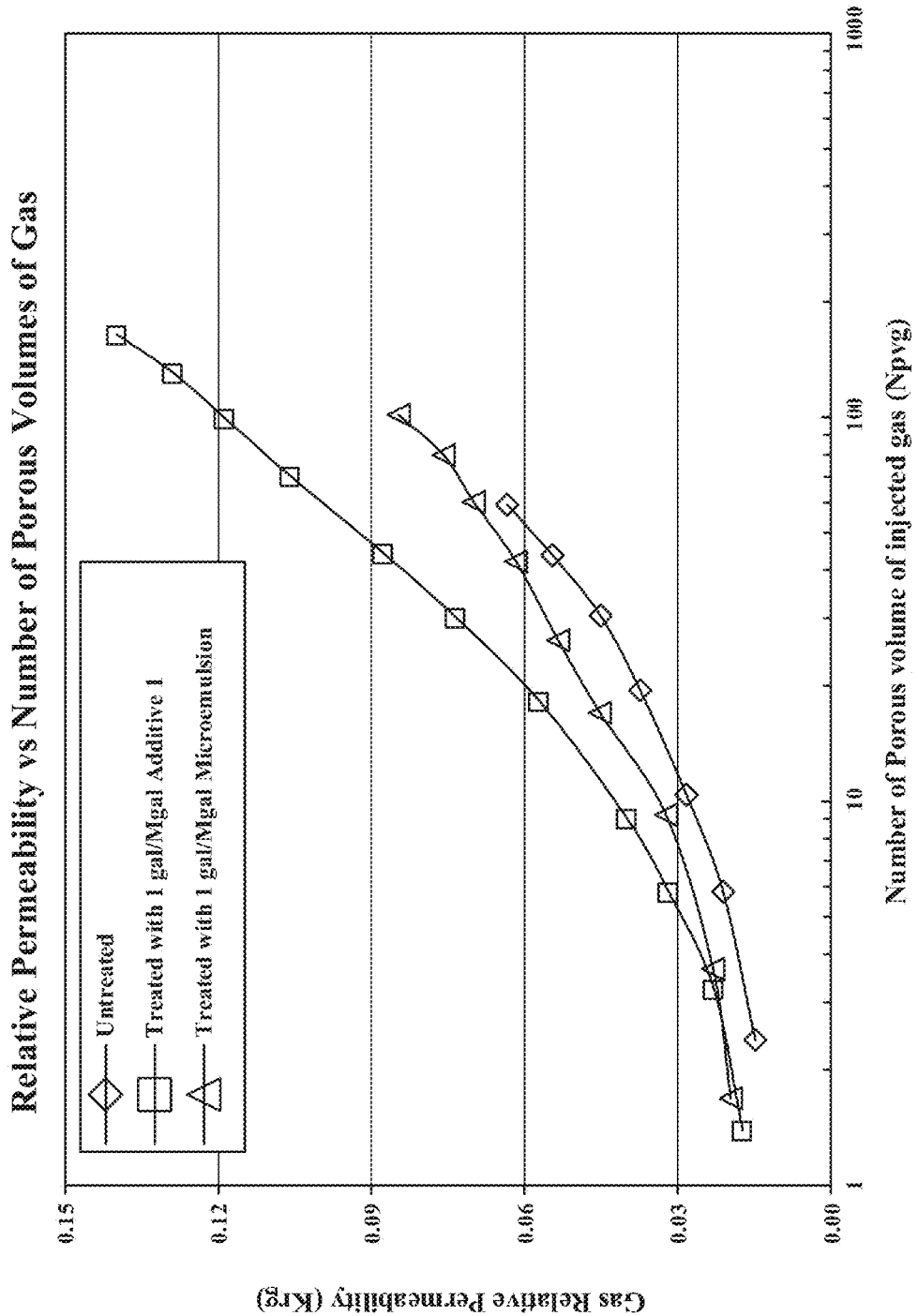
FIG. 9 depicts a plot of relative permeability versus number of porous volumes of gas for untreated and treated core samples.

Referring to FIG. 9, a comparison of relative gas permeability versus number of porous volumes of gas for an untreated core sample, a core sample treated with 1 gal/Mgal Additive 1 and a core sample treated with 1 gal/Mgal NWE-348LN microemulsion is shown. Both systems showed improved performance relative to the untreated core, but the core treated with Additive 1 showed significant improved performance even over the micro emulsion.

Figure 10:
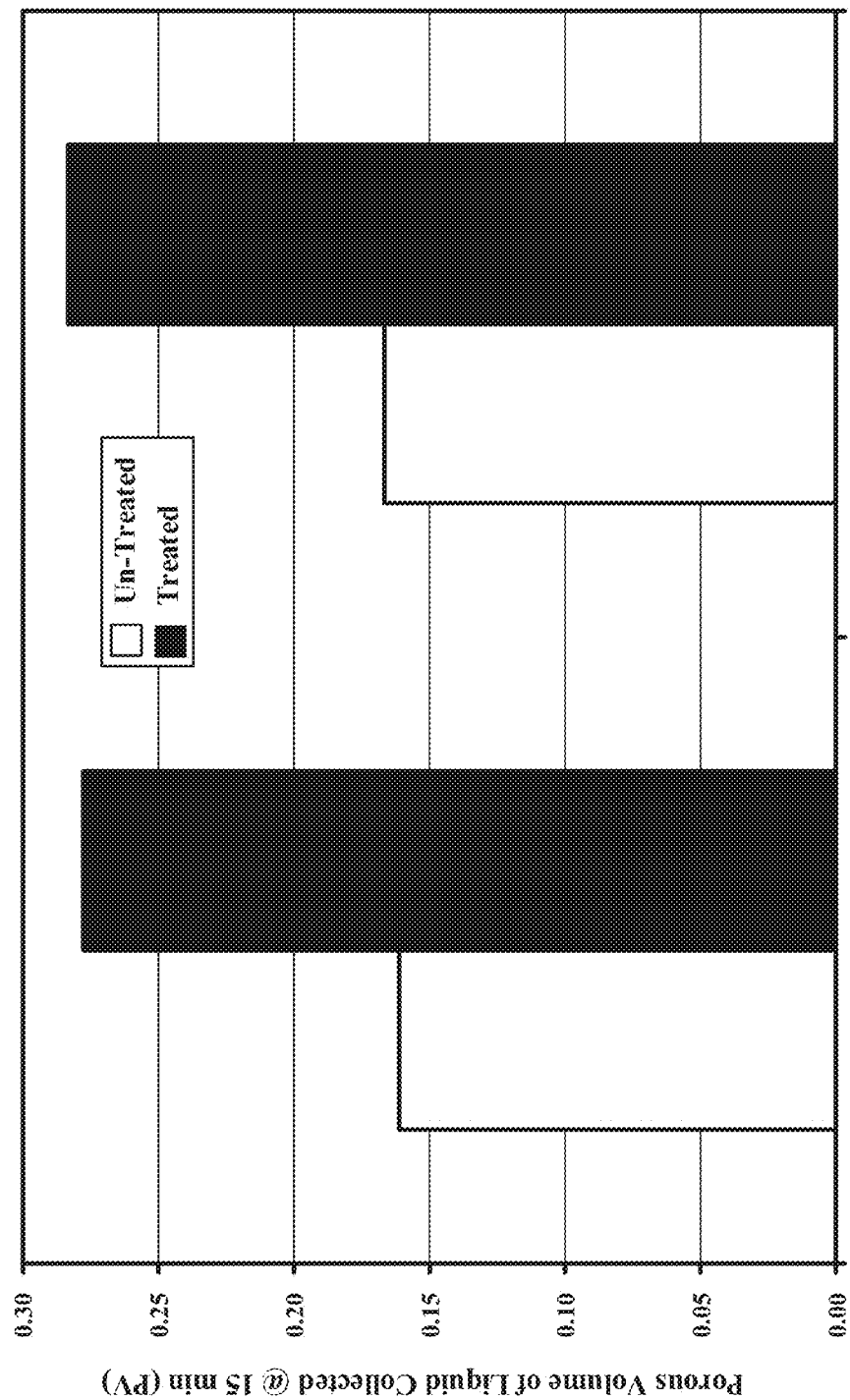
FIG. 10 depicts a plot of flow rate recovery versus number of porous volumes of gas for untreated and treated core samples.

Referring to FIG. 10, a comparison of relative gas permeability after 15 minutes post treatment of an untreated core sample, a core sample treated with 1 gal/Mgal Additive 1 and a core sample treated with 1 gal/Mgal NWE-348LN microemulsion is shown. Both systems showed nearly equivalent recovery of gas flow compared to the untreated core sample.

Figure 11:
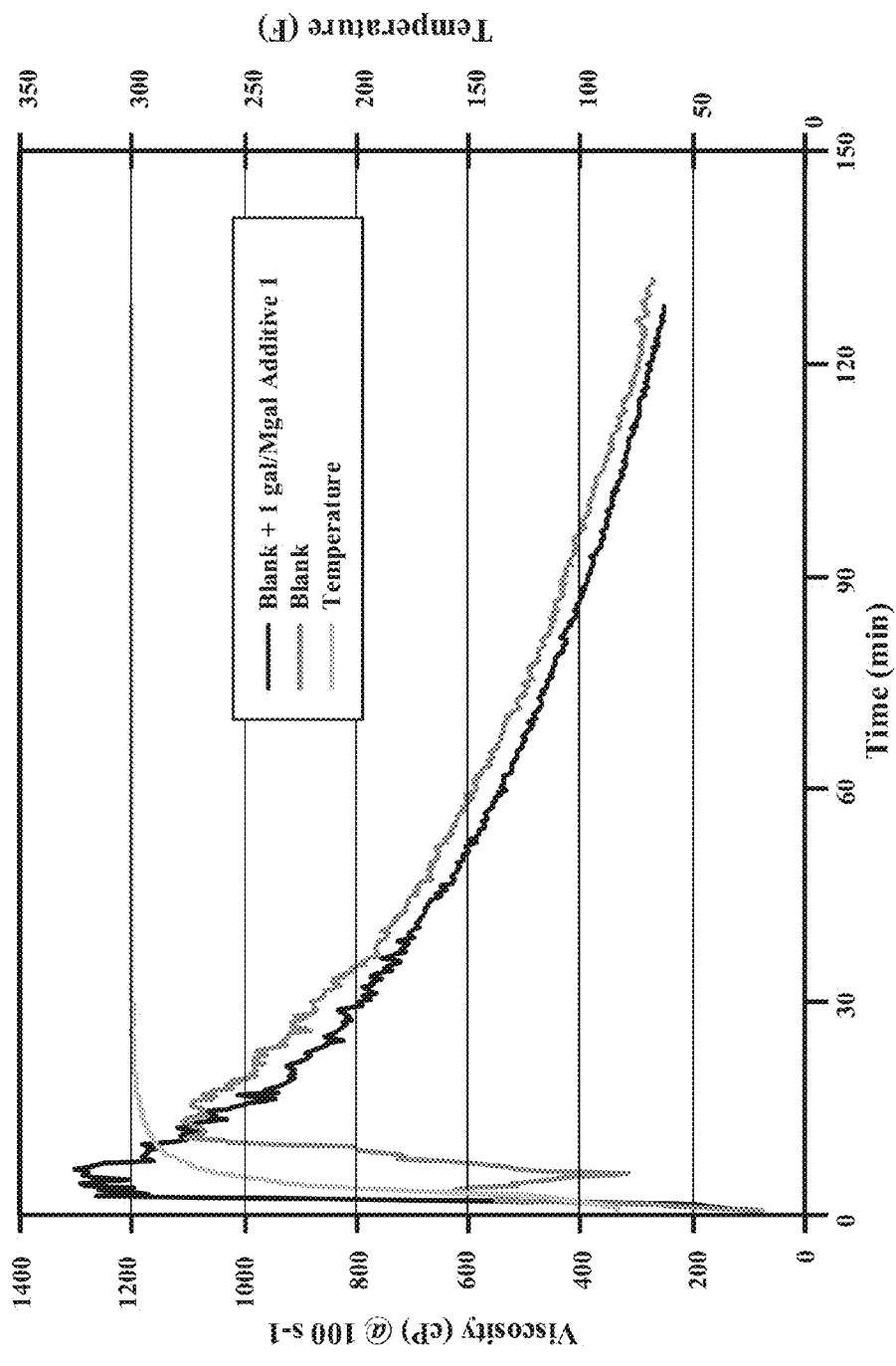
FIG. 11 depicts a plot of rheological data for Magnum Frac H system with an additive of this invention designated Additive 1.

Referring to FIG. 11, a comparison of Theological properties of fracturing with the Magnum Frac H system including 1 gal/Mgal Additive 1 in a NWE-348LN microemulsion fracturing fluid is shown. We observed that the Additive 1/NWE-348LN system produced higher initial viscosities, but that its breaking profile is very similar to the breaking profile of the blank or control system.

Figure 12:
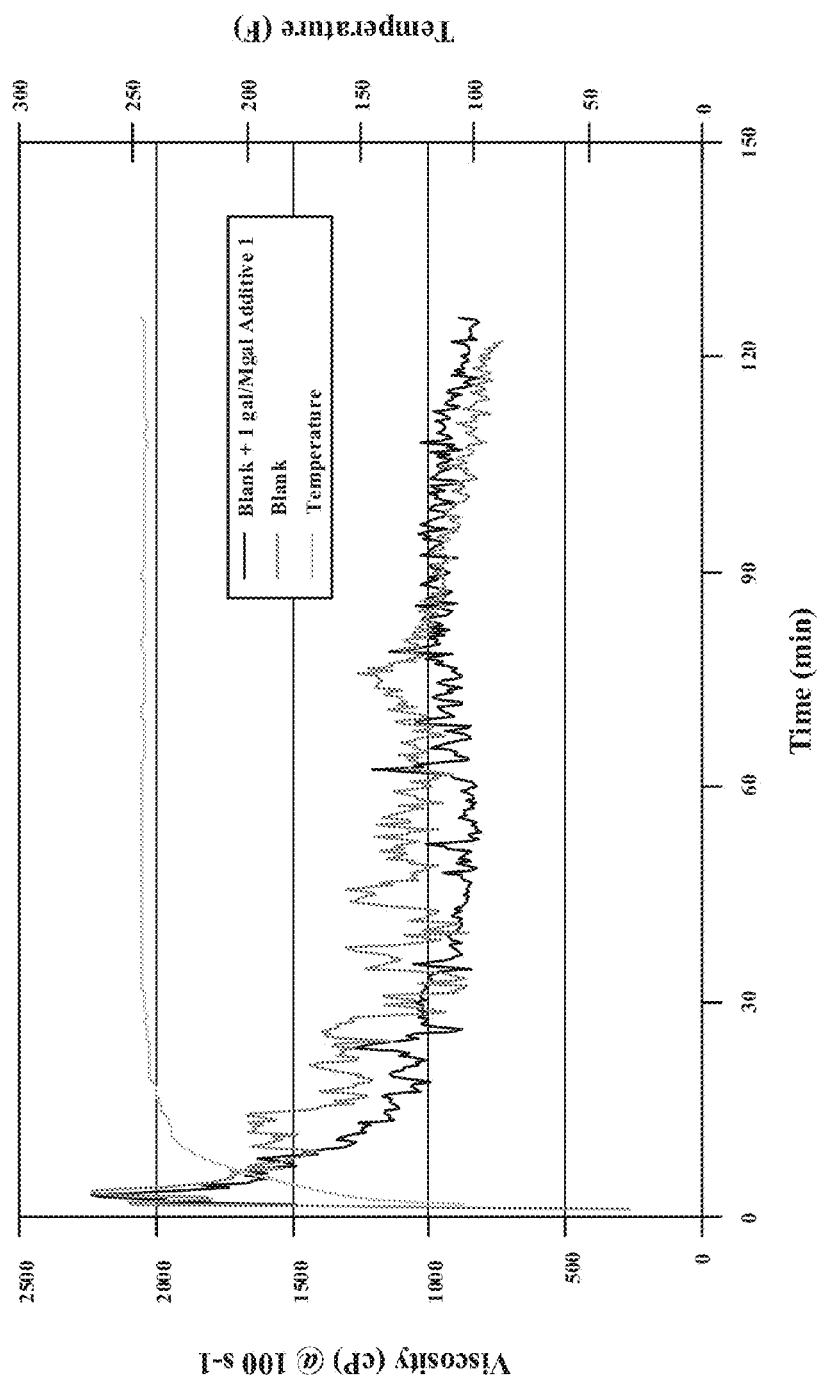
FIG. 12 depicts a plot of rheological data for DynaFrac HT system with added Additive 1.

Referring to FIG. 12, a comparison of Theological properties of fracturing with the DynaFrac HT system including 1 gal/Mgal Additive 1 in a NWE-348LN microemulsion fracturing fluid is shown. We observed that the Additive 1/NWE-348LN system behaved essentially identically to the blank system or control system.

All references cited herein are incorporated by reference. Although the invention has been disclosed with reference to its preferred embodiments, from reading this description those of skill in the art may appreciate changes and modification that may be made which do not depart from the

We claim:

1. A method for improving gas production from a formation comprising the step of:

treating a formation with a treating composition comprising a reaction product of an amine and a phosphate-containing compound to produce partially or completely coated formation surfaces, formation particulates, and formation fines changing a wettability value to a value closer to neutral than in the absence of the coating and thereby reducing water blocking, improving water displacement, improving relative gas permeability and improving gas production in the formation and where the coating is deformable, where:

the composition comprises a reaction product of an amine and a phosphate ester, the amine is of the general formula $R^1$, $R^2NH$ or mixtures or combinations thereof, where $R^1$ and $R^2$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, and the phosphate esters include phosphate esters of the general formula $P(O)(OR^3)(OR^4)(OR^5)$, polymers thereof, or mixture or combinations thereof, where $R^3$, $R^4$, and $OR^5$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, and where the amine is selected from the group consisting of aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, and mixtures or combinations thereof.

2. The method of claim 1, wherein the reaction product further changes a zeta potential and/or aggregation potential of the formation surfaces, particulates, and/or fines.

3. The method of claim 1, wherein the phosphate ester comprise phosphate ester of alkanols having the general formula $P(O)(OH)_x(OR^6)_y$ where $x+y=3$ and $R^6$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

4. The method of claim 1, wherein the reaction products comprise phosphate esters of alkanol amines having the general formula $N[R^7OP(O)(OH)_2]_3$ where $R^7$ is a carbenzyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof.

5. The method of claim 1, wherein the phosphate ester comprise phosphate esters of hydroxylated aromatics.

6. The method of claim 1, wherein the phosphate ester comprise phosphate esters of diols and polyols.

7. The method of claim 1, wherein the phosphate acid comprises polyphosphoric acid.

8. The method of claim 1, wherein the formation particulates, formation fines and/or fracturing proppants are selected from the group consisting of natural or synthetic metal oxides and/or ceramics, metals, plastics, solid materials derived from plants, and mixtures or combinations thereof.

9. The method of claim 8, wherein the metal oxides including any solid oxide of a metallic element of the periodic table of elements.

10. The method of claim 9, wherein the metal oxides and/or ceramics are selected from the group consisting of include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides.

11. The method of claim 8, wherein the plant materials is selected from the group consisting of shells of seed bearing plants, ground wood or other fibrous cellulosic materials, or mixtures or combinations thereof.

12. A method for improving gas production from a formation comprising the step of:

pumping a fluid into a formation at a rate and a pressure sufficient to fracture the formation in the presence or absence of a proppant, where the fluid includes a treating composition comprising a reaction product of an amine and a phosphate-containing compound to produce partially or completely coated formation surfaces, formation particulates, formation fines and/or proppant changing a wettability value to a value closer to neutral than in the absence of the coating and thereby reducing water blocking, improving water displacement, improving load recovery, reducing water saturation, improving relative gas permeability and improving gas production in the formation and where the coating is deformable, where:

the composition comprises a reaction product of an amine and a phosphate ester, the amine is of the general formula $R^1$, $R^2NH$ or mixtures or combinations thereof, where $R^1$ and $R^2$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, and the phosphate esters include phosphate esters of the general formula $P(O)(OR^3)(OR^4)(OR^5)$, polymers thereof, or mixture or combinations thereof, where $R^3$, $R^4$, and $OR^5$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, and where the amine is selected from the group consisting of aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, and mixtures or combinations thereof.

13. The method of claim 12, wherein the reaction product further changes a zeta potential and/or aggregation potential of the formation surfaces, formation particulates, formation fines, and/or proppants.

14. The method of claim 12, further comprising
prior to fracturing or after fracturing, treating the formation with the treating composition.

15. The method of claim 12, wherein the phosphate ester comprise phosphate ester of alkanols having the general formula $P(O)(OH)_x(OR^6)_y$ where $x+y=3$ and $R^6$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

16. The method of claim 12, wherein the reaction products comprise phosphate esters of alkanol amines having the general formula $N[R^7OP(O)(OH)_2]_3$ where $R^7$ is a carbenzyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof.

17. The method of claim 12, wherein the phosphate ester comprise phosphate esters of hydroxylated aromatics.

18. The method of claim 12, wherein the phosphate ester comprise phosphate esters of diols and polyols.

19. The method of claim 12, wherein the phosphate acid comprises polyphosphoric acid.

20. The method of claim 12, wherein the proppant is selected from the group consisting of natural or synthetic metal oxides and/or ceramics, metals, plastics, solid materials derived from plants, and mixtures or combinations thereof.

21. The method of claim 20, wherein the metal oxides including any solid oxide of a metallic element of the periodic table of elements.

22. The method of claim 21, wherein the metal oxides and/or ceramics are selected from the group consisting of include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides.

23. The method of claim 20, wherein the plant materials is selected from the group consisting of shells of seed bearing plants, ground wood or other fibrous cellulosic materials, or mixtures or combinations thereof.

* * * * *